Dec. 2, 1969   F. SOLARI   3,482,240
DEVICE FOR CONTROLLING AND AUTOMATICALLY CORRECTING THE
SYNCHRONIZATION OF INDICATOR ELEMENTS IN
REMOTE DISPLAY MECHANISMS
Filed April 21, 1966   4 Sheets-Sheet 1
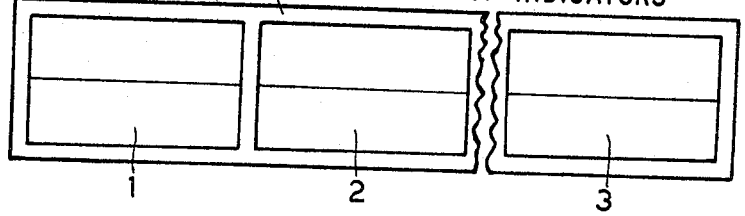
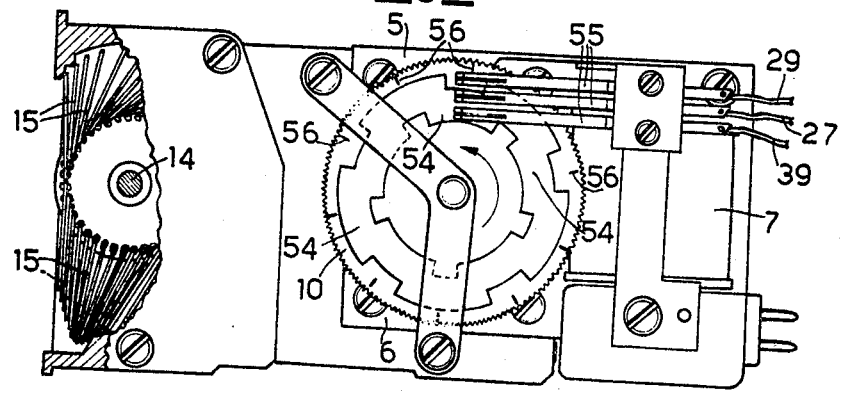
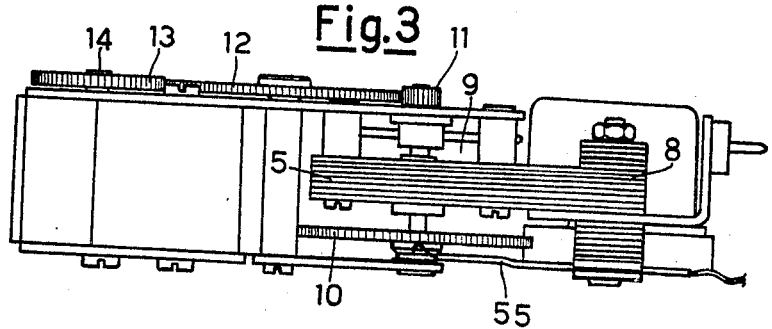

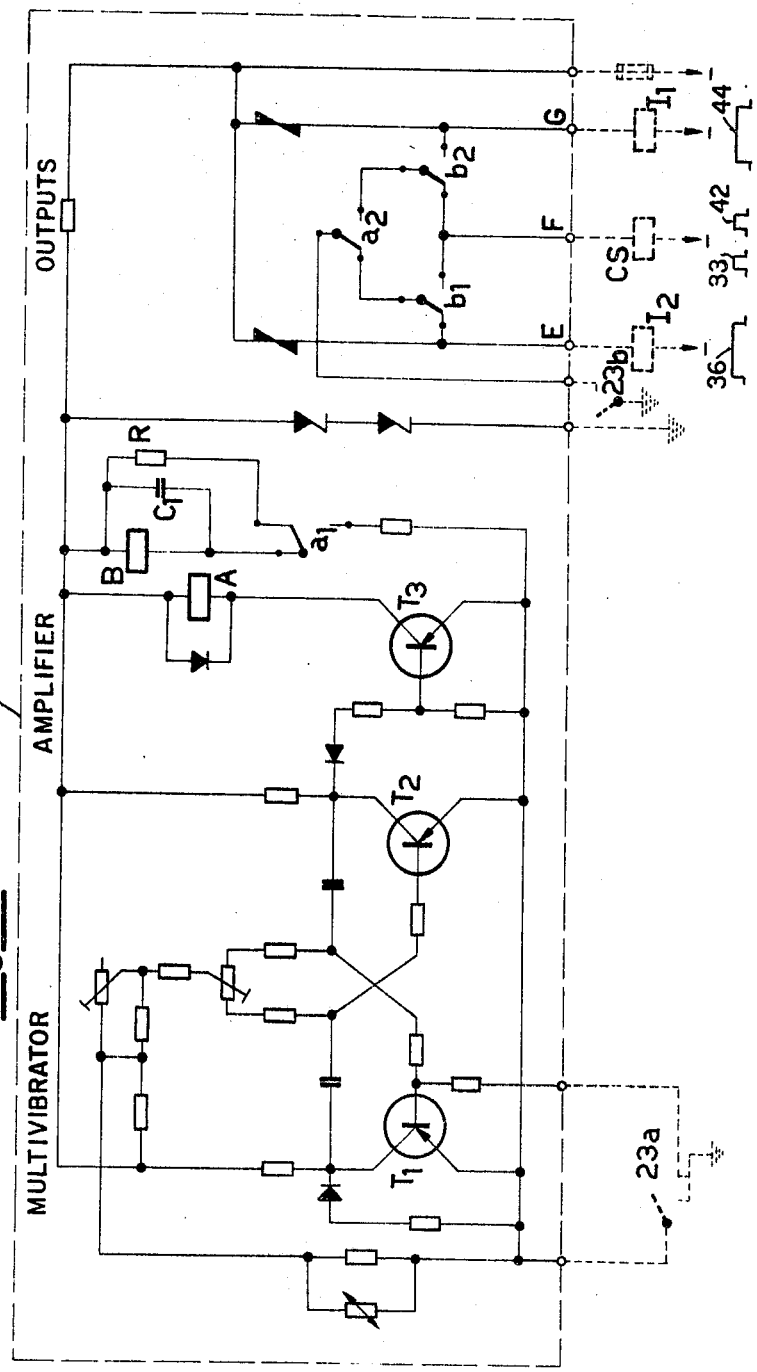

United States Patent Office 3,482,240
Patented Dec. 2, 1969

3,482,240
**DEVICE FOR CONTROLLING AND AUTO-
MATICALLY CORRECTING THE SYNCHRO-
NIZATION OF INDICATOR ELEMENTS IN
REMOTE DISPLAY MECHANISMS**
Fermo Solari, Udine, Italy, assignor to Solari & C./Udine
S.p.A., Udine, Italy, an Italian company
Filed Apr. 21, 1966, Ser. No. 544,283
Claims priority, application Italy, Apr. 23, 1965,
9,014/65
Int. Cl. G08b *23/00;* H05b *39/00, 41/00*
U.S. Cl. 340—325                                7 Claims

ABSTRACT OF THE DISCLOSURE

In a device for controlling and automatically correcting the synchronization of indicator elements of a remote display system the rotors of its polarized pulse drive motors are connected to members which alternately take one of two stages, each of these stages being indicative of the last pulse which actuated the motor; if the members are all in the same stage, drive pulses are alternately transmitted to the motors on two separate control paths. If, however, at least one of these motors fails to advance, the control path for the subsequent drive pulse is blocked due to the different states of the members whereby pulses are fed to the non advanced motors on the same control path.

---

This invention relates to a device for controlling and automatically correcting the synchronization of the indicator elements (or signalling elements), such as indicia, pallet-carrying drums, tapes, disks or stencilled or script-bearing cylinders of remote-display or remote-signalling systems in which a plurality of indicator elements are positively driven so as to be moved simultaneously and in attunement, each of them being driven by a step-by-step advance fractional horsepower motor driven by polarized pulses, means being provided adapted selectively to pre-set said motors for rotation, said motors being mutually connected in parallel so that the same polarized pulse may induce rotation of all those motors in the system, which have been preset for rotation.

Motors which are advanced in a step-by-step fashion under the drive of polarized pulses are well known in the art and are disclosed, for example, in the French patent specification No. 1,090,465 and in the British patent specification No. 955,986, it being sufficient herein to recall that, if one of these small motors is caused to advance step-by-step under the action of a polarized pulse, the same motor should be fed with a pulse having a polarity opposed to that of the previous pulse in order that it be able to take a further step forward, inasmuch as a pulse having the same polarity of the previous pulse would have no effect on said motor.

It is known that in the remote-display systems there is a plurality of display boards, equal to and spaced apart from, one another, each board being formed by a plurality of remote indicators whose indicating elements give a complete set of information. For instance a display board may be formed by four remote-display indicators mounted side by side within a single frame and the indicating element for each indicator be a pallet-carrying drum: the pallets of the first indicator will show, for example, the destination of a train, the pallets of the second, the way, the pallets of the third, the hour and those of the fourth the minute of departure of said train. In a railway station there is generally a plurality of display boards equal to one another and intended simultaneously to give the same information. One of these boards could be located, for example, in the station's hall, another along the relevant railway track, others in the several waiting-rooms and so forth.

When the central control switchboard of the remote-display system transmits the controls to form a certain complete information on the individual display boards, it is necessary that such an information be repeated on all of the display boards at the same time and with a maximum accuracy. To limit the example to the trivial case outlined above, it should be avoided that a display board in the station's hall may indicate that a train bound for a certain town is due to start from a certain track while the corresponding display board placed in the neighbourhood of said track indicates that a train bound for a place other than that indicated by the display board of the station's hall. Such a trouble could be experienced due to the loss, by one or more of the motors which are a part of the remote-display system, of one of the polarized control pulses: one of the motors could have failed, or a grain of dust, or other defect, could have hindered for a short time the advance stop of a motor or motors.

The principal problem which arises, and which is solved by the present invention, is that of impeding that not perfectly equal indications may appear on a plurality of display boards intended for giving the same information. Further, since the control of the movement is sent to all the remote-indicators of a board and to all the remote-indicators of a plurality of boards simultaneously, the principal object of this invention is that of stopping the rotational motion of all of the motors of the remote indicators as soon as one or more motors have lost a step due to the loss of one of the control pulses, by permitting, however, that pulses having a polarity equal to that of the lost pulse may be sent to those motors which had been arrested in any undesirable position, so that only those motors be driven to rotation. As soon as the particular motor (or motors) has made a step forward, thus coming into attunement with the motors of the other indicators, the routine operation is resumed.

Another object of the present invention is to provide alarm means adapted to signal to the control switchboard the existence of a failure in one of the remote indicators, when a predetermined number of pulses is unsuccessful in driving the motor or motors which had lost a pulse.

A further object is to provide a system adapted to cause the automatic resetting of all the remote indicators of the system whenever one of the motors which had lost a pulse is not driven by a preselected number of pulses having a polarity equal to that of the lost pulse.

The foregoing and other objects are achieved by the inventive device in which the rotating part of each motor is mechanically connected to a synchronization-controlling member which alternatively takes, at each successive step of the motor, either of two states, each of them indicating, in the at rest condition of said motor, the last pulse which has actuated said motor, said control members being mutually electrically connected in such a way that, if in a certain instant of time the members of all those motors which are preset to rotation are all in the same state, said motors can be fed by a pulse having a polarity opposite to that which has caused the previous step, whereas, if in the same instant of time at least one of said members is in a state other than those of the others, the arrival to the motors of pulses having a polarity opposite to that of the last transmitted pulse is impeded, while the arrival of pulses having the same polarity if the last pulse is permitted, alarm means being provided, adapted to signal the state of inequality of said members.

The advantages which can be achieved are many. In the first place, assuming that the remote display system comprises also the pilot members of the remote indicators, said pilot members being formed, as will be explained hereinafter, by selectors, also driven by polarized motors, a system is obtained in which the positioning of the remote indicators is controlled at each step and in which the lack of attunement or loss of a step of any remote indicator motor under control with respect to the others is detected and immediately corrected in quite automatic a way. In the case in which such a correction cannot take place, the lack of attunement is signalled to the central control switchboard. The device enables to position a number, no matter how great, of remote indicators by overcoming all the positioning errors caused by the failure of the rotation of one or more motors due to the loss of one of the control pulses which actuate the remote indicator driving motors, by employing failsafe technical means which are cheap and without unduly increasing the number of conductors necessary for connecting the central control switchboard to the remote indicators.

A further advantage lies eventually in that, if it is not possible to overcome the positioning error of one or more motors which has lost a control pulse, in that the motor(s) failed, the inventive device gives rise to the automatic resetting of all the remote indicators, obviously excluding the one which could no longer be moved, the latter being thus easily identified and fixed.

The foregoing and other objects and advantages will become apparent from the ensuing description wherein a merely exemplary and not limiting embodiment of the device is illustrated with reference to the accompanying drawings, wherein:

FIGURE 1 is a diagrammatical front view of a complete information display board consisting of more remote indicators.

FIGURE 2 is a side view of a remote indicator with its basic component parts.

FIGURE 3 is a top view of the remote indicator shown in FIG. 2.

FIGURE 10 is a simplified diagram of the pulse genertaor which feeds out the pulses illustrated in FIG. 5.

Figure 4:
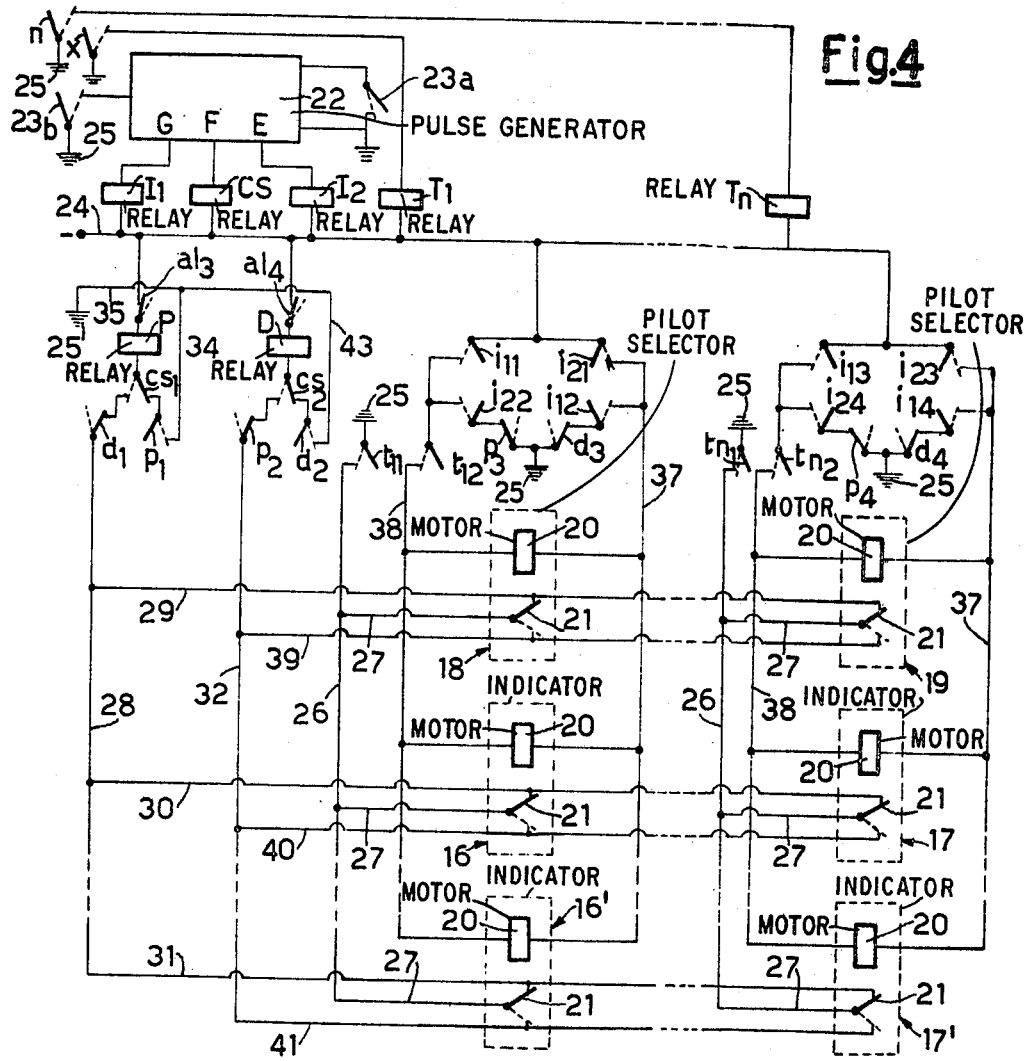
FIGURE 4 is the overall simplified diagram of the device for automatically controlling and correcting the attunement of a plurality of remote indicators along with their attendant pilot members, also diagrammatically shown in the drawing.

In FIGURE 1 has been shown a complete information display board formed by a plurality of pallet-drum remote indicators 1, 2 and 3 placed in side by side relationship and enclosed within a boxlike frame 4. The pallets of the remote indicator 1 will display for example the information as to the places of destination of a train, those of the remote indicator 2 the information as to the railway track, and those of the remote indicator 3 the information as to the minutes.

One of the remote indicators, which are all equal and differ only as regards the legends borne by the pallets, is illustrated in side view in FIGURE 2 and in top view in FIGURE 3: it consists of an upper stator pack 5 and a lower stator pack 6, a winding 7 with its core 8, a rotor 9 with a ratchet and pawl mechanism 10 and a pinion 11 which, via a drive transfer gear 12 transfers the drive to a wheel 13 keyed to the axle 14 of a pallet drum 15. Other component parts of the remote indicator, which can be seen in FIGS. 2 and 3 will be described hereinafter.

Having now reference to FIGURE 4, the indicator members and the pilot selectors thereof have been indicated within dotted blocks: more precisely, and still to make things clear with the aid of the practical example aforementioned, the frame 16 and the frame 17 are a part, with the other frames inserted therebetween and not shown to simplify the drawing, of a single complete information display board in which 16 is the indicator member carrying the indication of the place to which a train is bound and 17 is the indicator member which shows the minutes of the time of departure of said train. The frames 16' and 17' are a part of another complete information display board which is identical to the one mentioned just now and placed in spaced apart relationship with respect to it.

The numerals 18 and 19 indicate pilot selectors (placed in the central control switchboard) whose functionality will become fully apparent hereinafter: the pilot selector 18 is connected in parallel to the indicator elements 16 and 16', that is with those elements which, in the example given hereinbefore, indicate the destination of a train, and the pilot selector 19 is connected in parallel with the indicator elements 17 and 17' which indicate the minute of departure of the train in question.

The indicating elements and the pilot selectors are all equipped with, and driven by, a small motor 20 of the kind which advances step by step under the drive of polarized pulses: each motor is connected to a synchronization control member which can consist of a two-leg contact 21 which alternatingly assumes, in correspondence with each successive step of the motor, either of two states, each state being indicative, when the motor is stationary, of the last pulse which has actuated said motor. The actuation, that is the change of state of the contacts 21, called synchronization contacts, can be obtained, for example, by means of cams which are not shown in order to simplify the drawings.

In the central control switchboard is located, in addition to the pilot selectors, a pulse generator 22: said generator can consist of an electronic bistable multivibrator circuit or relay, by an amplifier circuit and by two relays as exemplarily shown in FIG. 10.

The bistable multivibrator comprises two transistors $T_1$ and $T_2$ and the amplification stage consists of a transistor $T_3$ which occasionally energizes the relay A, the latter controlling, in turn, via one of its contacts $a_1$ another relay B: this relay is delayed, both in its active and its return stroke, by a capacitor $C_1$ and a resistor R.

The multivibrator is started by closing a contact 23$a$ and generates conventional square pulses in a way well known per se. At each half-cycle with the transistor $T_2$ non-conducting, the transistor $T_3$ is conductive and the relay A is energized. By its contact $a_1$, said relay A energizes also the relay B which, however, is energized with a delay.

Figure 5:
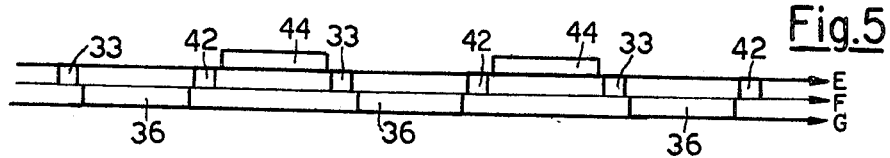
FIGURE 5 is a plot showing the shape of the pulses fed out of a pulse generator which controls the actuation of the device.

The relay has a further switching contact $a_2$ which is grounded via a contact 23$b$ actuated simultaneously with the contact 23$a$ and feeds a pyramid formed by two switching contacts $b_1$ and $b_2$ of the relay B to supply the three separate outputs E, F and G with a sequence of non-polarized pulses as shown in FIG. 5. The long pulses 36 are shown in the plot of FIG. 5 under the central line, only to make it clear that they are fed to an output of the generator other than that used for the long pulses 44. It should be borne in mind, however, that all the pulses shown, 33, 36, 42 and 44 have the same polarity and the short pulses 33 and 42 are fed out at the output F, the long pulses 36 to the output G and finally the long pulses 44 to the output E.

Closing the contacts 23a and 23b energizes the relay a. Its contact $a_2$ is switched and, via the contact $b_2$ of the relay B which is not yet activated, a short pulse 33 is supplied to the output F, a pulse whose duration equals the time of delay of suction of the relay B. As soon as the relay B is energized, it switches the position of its contacts $b_1$ and $b_2$ and, via the contacts $a_2$ and $b_2$ a long pulse 36 is supplied to the output G. As the relay A under the control of the multivibrator is deactivated, its contacts $a_1$ and $a_2$ are restored to the position indicated in the diagram of FIG. 10, whereas the relay B, due to the delay in dropping, remains still energized for a short time. Thus, a further short pulse 42 is supplied to the output F via the contacts $a_2$ and $b_1$. The deactivation of the relay B supplies a long pulse 44 to the output E via the contacts $a_2$ and $b_1$, both in the position shown in FIG. 10. On the subsequent energization of the relay A, the cycle just now described is repeated.

The short pulses, or control pulses, 33 and 42 energize a relay CS called synchronization control relay, connected to the output F of the generator, consequently actuating the movable contacts $cs_1$ and $cs_2$, whereas the long pulses 36, or driving pulses, shown in the lower portion of the diagram of FIG. 5 and the long pulses 44 shown in the upper portion of the same diagram energize a relay I1 and I2 connected to the output G and the output E of the generator, respectively, actuating from time to time the movable contacts $i_{11}$, $i_{12}$ etc. and $i_{21}$, $i_{22}$ etc. In the central control switchboard of the remote display system a relay P and a relay D are provided, with their related movable contacts $p_1$, $p_2$ etc., and $d_1$, $d_2$, etc. and relays $T_1 \ldots T_n$ with their attendant movable contacts $t_{11}$, $t_{12}$, etc. $tn$, $tn_1$, $tn_2$, etc. in a number equal to that of the remote indicators comprises in a complete information display board: said relays $T_1 \ldots T_n$ have been shown, for the sake of simplicity, as being individually actuatable by the closure of the contacts $x \ldots n$. The connections between the several portions of circuitry as mentioned are as shown in FIGURE 4: more particularly, 24 indicates a lead connected to a source of negative potential and 25 indicates a power source at a positive potential. The contacts $al_3$ and $al_4$ shown above the relays P and D are actuated by a relay (not shown in FIG. 4) which will be shown hereafter.

In the idle condition of the remote data display system, that is under the condition in which no portion of the system is fed or energized, all the movable contacts shown in the drawing are in the position indicated with a solid line in the same figure: more particularly, it can be seen that all the synchronization control contacts 21 connect the leads 26, via leads 27, to a same lead 28, called the synchronization control lead, through the leads 29, 30 and 31.

Starting from the at rest condition of the remote display system let us assume that it is desired to cause a certain information to appear in each frame of the plurality of display frames: let us assume that such information comprises the indication of the destination and the minute of the time of departure of a train, that which means that 16, 16′ and 17, 17′ should be moved from their at rest position. In the first place, the movable contacts $x$ and $n$ are closed, thus causing the energization of the relays $T_1$ and $T_n$ and the consequent actuation of the movable contacts $t_{11}$, $t_{12}$ and $tn_1$, $tn_2$ which are brought to the position shown in dotted lines in FIG. 4, so that the lead 28 is connected to the positive potential source via the leads 29, 30 and 31, the contacts 21, the leads 27 and 26 and the contacts $t_{11}$ and $tn_1$. Concurrently with the closing of the contacts $x$ and $n$ the contacts 23a and 23b are closed, thus starting the pulse generator 22 which sends the set of pulses shown in the diagram of FIG. 5 and which are intended for driving the polarized motors, for the control of synchronization of the movement of all the motors, and for arresting the remote indicators in a preselected position.

In the diagram of FIG. 5 it can be seen that the generator 22 feeds a separate output F a control pulse (short pulse) 33 or 42 before every driving pulse (long pulse) 36 or 44: the driving pulses are repeated by the relays $I_1$ and $I_2$ and sent to the motors 20 under the control of the contacts of the relays P, D and T. The control pulses actuate the relay CS which, with its contacts $cs_1$ and $cs_2$, inserts the relays P and D on the synchronization control leads 28 and 32: the energization of the relay CS and thus the insertion of the relays P and D on the control leads 28 and 32 is effected before any suction of the relays $I_1$ and $I_2$, and thus before the motors may receive each driving pulse.

Upon starting, the generator 22 emits, first of all, via the output F a control pulse 33 (FIG. 5) which actuates the relay CS, the latter bringing the two contacts $cs_1$ and $cs_2$ in the position indicated in dotted lines in FIG. 4; thus, the relays P and D are inserted on the control leads 28 and 32, but only the relay P is energized in that, since all the remote indicators and the selectors are in their inactive position, that is reset, the lead 28 only, via the contacts 21, is fed by a positive potential, as can readily be seen in FIG. 4.

The energization of the relay P causes its contacts $p_1 \ldots p_5$ to be displaced towards the position indicated in dotted lines. As the pulse 33 goes down and the relay CS is de-engerized, the contacts $cs_1$ and $cs_2$ are restored to the position shown in solid line, whereas the relay P remains fed and energized via the contact $cs_1$, the contact $p_1$ which is in the position indicated in dotted lines, the leads 34 and 35 and the source 25. Contrarywise, the relay D remains de-energized since the contacts $d_1$ are in the position indicated in solid lines. At the end of the control pulse 33, the generator 22 emits, via the output G, the first driving pulse 36 which actuates the relay $I_1$, the latter bringing the contacts $i_{11} \ldots i_{14}$ in the position indicated in dotted lines in FIG. 4. Thus, the positive sources 25 are connected through the contacts $d_3$ and $d_4$ to the rest position, the contacts $i_{12}$ and $i_{14}$ and the line leads 37 to a side of the motors 20 which are connected, at the other side, to the lead 24 having a negative potential, via the contacts $i_{11}$, $i_{13}$, $t_{12}$ and $tn_2$, respectively and the line leads 38. The motors 20 receive the first pulse and make the first rotational step by switching the control contact 21 from the leads 29, 30 and 31 to the leads 39, 40 and 41, respectively, said wires being connected to the control lead 32. By so doing, the positive potential is now active on the lead 32 which comes to the relay D and no longer on the lead 28 which connects the relay P. Under these conditions, the relay P is still fed by its holding circuit, that is by the source 25 through the leads 35 and 34, and the contacts $p_1$ and $cs_1$.

At the end of the driving pulse 36, the generator 22 emits a control pulse 42 which energizes the relay CS again, while contacts $cs_1$ and $cs_2$ repeat the insertion of the relays P and D on the control leads 28 and 32. Under these conditions, the relay P becomes connected to the lead 28 which is not fed, so that all its contacts revert to the position indicated in solid lines; thus, the circuit of the relay D is automatically completed, and said relay is energized by the positive potential of the lead 32 through the contacts $p_2$ and $cs_2$.

When the pulse 42 goes down, the contacts $cs$ revert to the position indicated in solid line, but the relay D stays energized through the contacts $cs_2$ and $d_2$ and the leads 43 and 35 from the source 25.

At the end of the control pulse 42, the generator 22 emits, through the output E a driving pulse 44 which energizes the relay I2 by actuating the contacts thereof which are brought to the position indicated in dotted lines: thus, there is a positive potential on the line lead 38 through the contacts $t_{12}$ and $tn_2$, respectively, and the contacts $i_{22}$ and $i_{24}$ and also the contacts $p_3$ and $p_4$, while there is a negative potential through the contacts $i_{21}$ and $i_{23}$ and the lead 24. Thus the motors 20 receive a pulse having a sense opposite to the previous one and make another rotational step forward: assuming that the motors are ten-step motors, each encompasses any angle having an amplitude of 36 degrees. The new step of the motors restores the contacts 21 to their initial positions, that is, connects the positive potential leads 26 to the lead 28, taking the positive potential out of the lead 32.

The starting conditions are thus restored and the cycle described above is repeated with the relays P and D which are alternatingly energized or deactivated according to whether the step to be taken by the remote indicators is of an even or odd order, that is dependent on whether the first pulse which causes the motors 20 to move has the positive polarity on the right or the left lead of said motors as viewed in the diagram of FIG. 4.

It clearly appears from the foregoing that in the stationary condition of the motors 20, the state of the contacts 21, that is whether or not they connect the leads 26 with the leads 28 and 32 is an indication of the last pulse which has actuated the motors: from the foregoing it is also clear that during their operation, all the motors of the selectors and the remote indicators are moved in attunement, and simultaneously.

If one or more of the selectors or remote indicators, for any reason, loses a driving pulse, that is, if the respective motor does not take the rotational step regularly together with the other ones and remains stationary in the previous position, that is if no synchronization exists any longer among all the moving members, the positive potential is present on both the control leads 28 and 32.

As a matter of fact, let us assume that, upon the aforementioned pulse 44 all the motors, one excepted, have taken a step: to make it clear let us assume that the motor 20 of the remote indicator 16 has lost the positive pulse fed along the lead 38 and did not move, that which could occur due to reasons which is unnecessary to discuss here but which could merely consist, for example, in the presence of a grain of dust in the actuating mechanism of the motor. If so, while the contacts 21 of the selectors and remote indicators which had regularly moved have been brought to the position shown in solid line connecting the leads 26 to the lead 28, the contact 21 of the remote indicator which has remained stationary in the position shown in dotted lines will connect the respective lead 26 to the lead 32.

When the generator successively emits a new pulse 33 thus energizing the relay CS, the relay D which was energized through its holding circuitry cannot be de-energized because its contact $cs_2$ finds a positive potential also in correspondence with its dotted line position. At the same time, the relay P cannot be energized in that the positive potential of the lead 28 is cut off from the contact $d_1$ which is in the dotted line position. When the pulse generator 22 emits the subsequent new pulse 36 which energizes the relay $I_1$, the motors are not fed by a positive pulse on the lead 37 in that, even though the contacts $i_{12}$ and $i_{14}$ are closed, the contacts $d_3$ and $d_4$ are open so that the same wire 37 cannot be connected to its respective source 25. The motors which previously moved under the drive of a positive pulse of the lead 38 and which now could move under the drive of a positive pulse on the lead 37 are thus kept at standstill.

After the pulse 36, the generator emits a new pulse 42 which, similarly to the pulse 33 discussed just now, leaves the relay D energized and the relay P de-energized. The subsequent feed of a new signal 44 energizes the relay 12 which actuates the contacts $i_{22}$ and $i_{24}$ thus completing the motor feeding circuit, so that a positive potential is present on the leads 38 via the contacts $t_{12}$ and $tn_2$, respectively, and the contacts $i_{22}$ and $i_{24}$, and $p_3$ and $p_4$ from the corresponding sources 25, while a negative potential will be present on the leads 37 through the contacts $i_{21}$ and $i_{23}$ and the lead 24.

The motors which had previously moved, are now stationary because the positive pulse on the lead 38 has the same sign of the pulse which had previously caused them to move; the motor of the remote indicator 16 which had missed a step is conversely urged by a pulse of the same sign of the previously missed one and is brought into attunement again with the motors of the other remote indicators and selectors, by an intervention of the automatic correction system. When the generator 22 emits a successive control pulse 33, the relay CS is energized and the relay D can be de-energized since no potential positive is any longer present on the lead 32, while the relay P is energized, thus permitting that a positive pulse be subsequently fed to the leads 37.

At this stage, the synchronization among the moving members is restored and the device goes on with its checking operation at every step of the motors as discussed above herein.

In the example described, it has been assumed that a single correction pulse was sufficient to restore all the remote indicators and selectors in mutual attunement. It is obvious, however, that if the lack of attunement persists, the device will continue to allow a single order of pulses to be sent (positive on the leads 37 and 38 dependent upon the state of the circuit) until such time as, in correspondence with one of the control pulses, the relays P and D ascertain the restoration of the synchronization conditions.

To avoid that a permanent failure of a remote indicator may block the whole system, the automatic control and correction device has a timing circuitry, which will be described hereinafter, and which enables it to send a limited number of correction pulses. If, at the end of a set of pulses the lack of attunement is still existent, the devices actuate in a manner to be described later, an alarm system which informs the operator of the system as to the irregular conditions, thus starting the automatic resetting of all the selectors and remote indicators involved in the operation under way in the instant of alarm.

To explain how this can take place, it is in order to anticipate a condensed explanation of the way in which, according to an embodiment, it is possible to stop all the remote indicators which indicate the same information, that is, to stop all the remote indicators which indicate, for example, the place of destination of the train, or the track and so on, respectively, as soon as the set of the corresponding remote indicators has reached the desired positions, obviously in the case in which the operation of the system could have taken place regularly.

Figure 8:
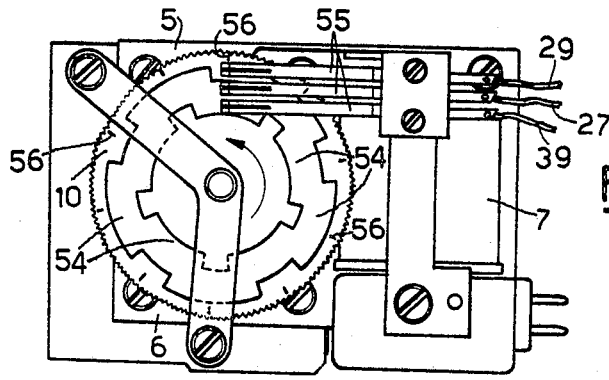
FIGURE 8 is a side view of a pilot member for a remote indicator.
Figure 9:
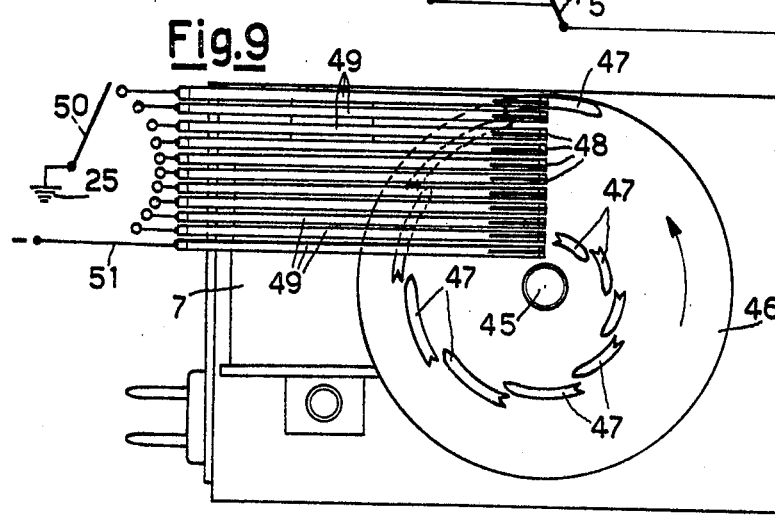
FIGURE 9 is a view, from the opposite side, of the pilot member of FIG. 8.

To this end, reference should be had, at the outset, to FIGS. 8 and 9: FIGURE 8 shows a side view of a selector. From this side the selector is very much the same as the assembly of the remote indicator as shown in FIGURE 2, the only difference being that it has no pallet drum, equal or similar parts having been connoted by like numerals. On the other side, the selector's appearance is substantially as shown in FIG. 9 and has, on the axle 45 of the rotor, or on another axle receiving the drive from the rotor via one or more drive-transmitting members, a wheel 46 having a surface coated by a layer of a conductor metal whereon insulated sectors 47 have been formed.

To simplify the showing, as aforesaid, it has been assumed that the motor's rotor makes a whole revolution through ten sequential steps each 36 degrees wide, it being also assumed that the pallets of the pallet drum of each remote indicator are in the number of ten and that the wheel 46 is directly keyed to the axle 45 of the selector's rotor and has ten insulated sectors, such as 47, that is as many as there are pallets in each remote indicator, arranged as shown in FIG. 9. On the wheel 46 rest eleven sliding contacts 48 arranged along the radii of a wheel and spaced apart from one another so as to come into contact, each, with a single sector 47 as the wheel is caused to rotate: only the contact which is closest to the axle 45 rests constantly on the conducting surface of the wheel 46. The contacts 48 are borne, each, by a bar 49, said bars being electrically connected, at their distal ends, to fixed contacts arranged along a half-circle about a movable contact 50 connected to a source of positive potential 25. The sliding contact closest to the axle 45 is fixedly connected to a lead 51.

A wheel with its contacts, such as described above, is mounted on each of the selectors of the system: the lead 51 is connected to one leg of the winding of one of the relays $T_1 \ldots T_n$ and the switch 50 takes the place of one of the switches $x \ldots n$ which have been diagrammatically shown in FIG. 4. To clear up the matter, let us consider the disc 46 of the selector which is in parallel with the remote indicators intended to indicate the place of destination of a train. In the central control switchboard, as soon as the device is started, by moving the switch 50, for example, onto the fifth contact starting from the farthest one among those illustrated in FIG. 9, the operator sends current to the fifth sliding contact 48: the current, passing over the conducting surface of the wheel is passed to the lead 51 and energizes the relay $T_1$ which thus closes the contacts $t_{11}$ and $t_{12}$ described above in the illustration of FIG. 4. When, during the stepwise advance of the selector's motor, a related insulated sector 47 comes beneath said fifth sliding contact (fed through the contact 50), the current feed is cut off the relay $T_1$ de-energizing the latter by opening the relevant contacts $t_{11}$ and $t_{12}$. The result is that the selector 18 and all of the remote indicators 16 and 16' intended to supply the several display frames with the indication of the train, are stopped, thus displaying in the board nothing else than the expected destination indication.

A similar mode of operation takes place for all the other selectors and remote indicators intended to display a different and distinct indication, under the control of separate relays T.

It should be noticed at this stage, that the pallet drum of each remote indicator can have ten pallets as outlined above, or any different number thereof, in which case the drive transfer from the motor axle and the axle of the pallet drum should be properly designed.

Figure 6:
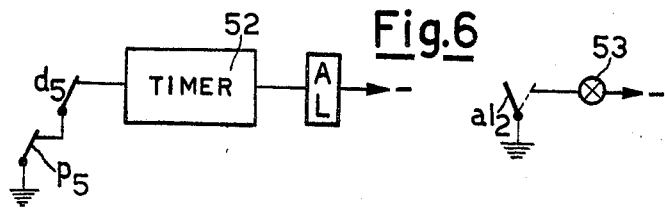
FIGURE 6 is the simplified circuit diagram of the circuit which sends an alarm signal to the central control switchboard and presets the automatic resetting of the remote indicators in the case in which one or more of the motors are unable to move under the drive of polarized pulses.

To resume the discussion initiated hereinbefore, let us assume that the failure of one of the motors involved in an operation under way is protracted in time beyond a preselected limit, that which involves the fact, outlined above, that either relay P or D remains constantly energized beyond a certain time limit. The result is then, as can be seen in the diagram of FIG. 6, that a timing circuit 52 energizes an alarm relay AL which moves its contacts from a position shown in solid lines in FIGS. 4 and 6 to a position shown in dotted lines. The actuation of the relay AL causes, via the contact $al_2$, the feed, to the central switchboard, of an alarm signal which gives rise, for example, to the lighting of a lamp 53 (FIG. 6) or, as an alternative, the actuation of a sound alarm which warns the operator that a failure has occurred in the system. Simultaneously, opening of the contacts $al_3$ and $al_4$, as shown in FIG. 4, cuts off, in an exemplary embodiment of the device, both the relays P and D, so that the alternate energization of the relays $I_1$ and $I_2$ causes the stepwise advance of all the motors, excluding obviously, the one for which a permanent failure has been experienced.

The energization of the relay AL with the consequent actuation of its contacts, moreover, causes, in a way which is unnecessary to explain in that one skilled in the art can embody it in an infinity of different manners and with facility, the positioning of the contacts 50 of all the selectors so as to connect the source 25 with the one of the sliding contacts 48 which corresponds to the rest position of the respective motors and remote indicators, so that the continuous advance of all the motors is arrested just in correspondence with that position. By so doing, the operator has been warned by the alarm signal of the existence of a failure in the system and is enabled readily to identify that remote indicator which had not been reset, and fix it.

Figure 7:
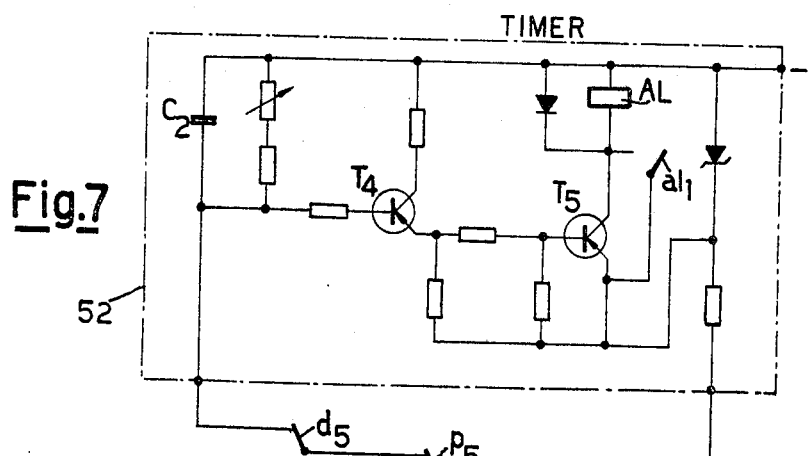
FIGURE 7 is the circuit diagram of a timing circuit which forms the circuitry of FIGURE 6.

The timing circuit 52, also called a timer, can also be embodied in many a different way and is of a conventional kind: an embodiment thereof is shown by way of example in FIG. 7. Said circuit is a two-stage switch with two transistors $T_4$ and $T_5$, the latter of which, when in its conducting state, energizes the relay AL which then is kept self-energized through its contact $al_1$. As a rule, the transistors $T_4$ and $T_5$ are not conducting in that their relevant emitters have a negative bias with respect to the input, which receives the bias through the contacts $d_5$ and $p_5$. The capacitor $C_2$ is charged at a voltage which corresponds to the input voltage. If the time of energization of the relays P and D is regular, the capacitor $C_2$ can never be discharged below the cutoff level of the first transistor $T_4$. If, contrariwise, the energization of either relay P or D (and thus the opening of either contact $p_5$ and $d_5$) persists beyond a certain limit, the cutoff of the transistor $T_4$ is ended and also the transistor $T_5$ becomes conducting, so that the relay AL is energized.

In the circuit of FIGURE 4, the contacts 21 of synchronization control have been illustrated and described as being formed by movable contacts actuated, intermediate the two states they can assume, by cams (not shown) driven by the motors 20.

In the embodiment of the device according to the invention, said assembly of contacts 21 is replaced, with advantage by a complex of sliding contacts resting upon the wheels 10 which permit the advance of the motors of the remote indicators and of the synchronizing devices, as shown in FIGS. 2 and 8.

This system affords, over the cam-actuated movable contact system, the advantage of a greater reliability in operation allied to a noticeably lower first cost. On each wheel 10 a printed circuit 54 is formed, with a conductor metal, arranged in sectors which, in the case of the ten-step motor as illustrated herein, are ten in number, alternatingly staggered either towards the center or the periphery of said wheel.

Three sliding contacts, each carried by a small bar 55, rest on the wheel 10 in correspondence with the conducting circuit. Of these sliding contacts, the one positioned between the other two, always rests on the conducting metal and is connected to a lead which has been connoted with the same numeral 27 which had been adopted in FIG. 4 to make clear the way in which the wheel with its printed circuit and the sliding contacts takes over the functions of the contact 21. The sliding contact arranged farther away than the other two is connected to the lead 29 and connects the latter with the lead 27 when one of the sectors of the printed circuit which is shifted towards the periphery of the wheel 10 comes beneath said lead 27.

The sliding contact which is positioned towards the axis of rotation of the wheel is connected to the lead 39 and connects said lead 39 with the lead 27 when one of the sectors of the printed circuit which is shifted towards the center of the wheel 10 comes beneath said lead 27.

In the position of the wheel as shown in FIGS. 2 and 8, the motor, and thus the wheel 10, are stationary: other stationary positions are in correspondence with the short notches 56 which has been marked, for clarification only, on the wheels 10.

To sum up this disclosure, it is then in order to notice that the switching circuit as described hereinbefore has been, for clarity, the conventional relay circuit, but the circuitry can obviously and readily be embodied also by electronic devices by employing transistors and diodes and making up a static-type unit.

What is claimed is:

1. A device for automatically controlling and correcting the synchronization of the indicating elements of a remote display system in which a plurality of indicating elements are driven to move simultaneously and in attunement with pilot indicating elements, each of said indicating elements being operated by a motor of stepwise advance type comprising a generator of control and drive pulses, presetting means adapted to preset the motor of said indicating elements for rotation, said motors being connected in parallel so that the same drive pulse drives to simultaneous rotation all those motors of the system which have been preset by said presenting means, a plurality of bistable switching members each being operatively connected to one said motors, said members being arranged to assume at each step of said motors alternatively one of two states, the state taken by each of said members being indicative, as the motors are stationary, of the last drive pulse which actuated said motors, synchronization control means controlled by said control pulses to alternatively direct said drive pulses on two separate control paths, said bistable switching members being electrically connected to one another and to said separate control paths for permitting transmission of a drive pulse to said motors on the control path opposite to that of the pulse which caused the previous step to occur provided all switching members are in the same state, while said transmission of said pulse to motors on the path opposite to that of the last transmitted pulse is impeded if at least one of said bistable switching members is in a state other than that of the remaining members, and alarm means for signalling the condition of inequality of the state of said members.

2. A device as set forth in claim 1, wherein said bistable switching members consist of disc-like wheels each having a printed circuit of a conductor metal disposed on an insulated surface thereof, and also comprising a plurality of sets of sliding contacts each set consisting of three contacts resting on the surface of one of said wheels, two of said contacts being connected from time to time with the third contact through said printed circuit during the rotational movement of said wheel which is connected to the rotor of one of said motors.

3. A device as set forth in claim 1 wherein said bistable switching members comprise a movable contact having two positions, said contact alternately taking one of two positions at each step of the motor to which it is mechanically coupled by a cam connected with the rotor of said motor for inducing the movement of said contact.

4. A device as set forth in claim 1, wherein a plurality of said presetting means is adapted to selectively preset for simultaneous rotation the motors of distinct groups of the indicator elements, said bistable switching members of corresponding motors in each of said distinct groups of indicating elements being connected in parallel between said two separate control paths in such a manner that in the condition of regular operation at which all said switching members are in state of synchronization said control paths alternately deliver drive pulses from said generator to said motors for providing the stepwise advance of all the motors while at the condition at which at least one motor of those preset for rotation has missed a step, said synchronization control means interrupts the alternation of said control paths for advancing the remaining synchronized motors and maintains via the bistable switching member of the non-advanced motor the conductive control path for the non-advanced motor until the state synchronism is restored, and said alarm means being energizable as a consequence of the persistence of the lack of the state of synchronization in said motors.

5. The device as set forth in claim 4, further comprising means for the automatic resetting of all the indicator elements, said resetting means being activated when said alarm means become energized.

6. The device as set forth in claim 1, wherein said generator of control and drive pulses has an output for first drive pulses, an output for second drive pulses and an output for control pulses occurring between said first and second drive pulses, a plurality of relays respectively actuated by the output of said generator, by said presetting means and by said synchronization control means, the contacts of said plurality of relays being connected one to another and to said bistable switching members to provide said presetting of the motors and the controlling of said separate paths.

7. The device as set forth in claim 1, wherein said pilot indicating elements are disposed at a central control station and said presetting means are adapted to immediately stop the indicating elements of the entire system as soon as the preset position thereof has been attained.

References Cited

UNITED STATES PATENTS 3,230,508  1/1966  Grijseels et al. _____ 340—325
3,297,927  1/1967  Blakeslee et al. _____ 318—138

JOHN W. CALDWELL, Primary Examiner

MARSHALL M. CURTIS, Assistant Examiner

U.S. Cl. X.R.

340—338